United States Patent [19]
Van Den Goor

[11] Patent Number: 5,826,695
[45] Date of Patent: Oct. 27, 1998

[54] CONVEYOR

[75] Inventor: Jacobus M. Van Den Goor, Nuenen, Netherlands

[73] Assignee: Vanderlande Industries Nederland B.V., Veghel, Netherlands

[21] Appl. No.: 779,238

[22] Filed: Jan. 3, 1997

[30] Foreign Application Priority Data

Jan. 12, 1996 [NL] Netherlands .......................... 1002087

[51] Int. Cl.$^6$ ................................................. B65G 47/34
[52] U.S. Cl. ...................................................... 198/370.02
[58] Field of Search ........................ 198/370.02, 370.03, 198/803.14

[56] References Cited

U.S. PATENT DOCUMENTS

| | | | |
|---|---|---|---|
| 4,128,163 | 12/1978 | Rana et al. .......................... | 198/370.02 |
| 5,127,510 | 7/1992 | Cotter et al. ....................... | 198/370.02 |

FOREIGN PATENT DOCUMENTS

| | | |
|---|---|---|
| 2 592 639 | 7/1987 | France . |
| 1 145 095 | 3/1963 | Germany . |
| 26 42 094 | 3/1978 | Germany . |

*Primary Examiner*—James R. Bidwell
*Attorney, Agent, or Firm*—Oblon, Spivak, McClelland, Maier & Neustadt, P.C.

[57] ABSTRACT

A conveyor including a frame and an endless drivable conveying element, which is provided with carriers extending transversely to the intended direction of movement of the conveying element during operation. The carriers are coupled to at least one endless flexible coupling member. While at least a few carriers support pusher elements, which pusher elements are connected to guides, which are capable of co-operation with guide rails supported by the frame. During operation a pusher element can thus be moved in the longitudinal direction of the carrier in one or more selected places along the intended direction of movement during operation. Seen in cross-sectional view a carrier comprises two upwardly extending legs bounding a recess having a U-shaped or V-shaped section and being open at its upper side, which legs are interconnected by a connecting piece forming the bottom of said recess. One leg of a carrier extends over a greater height than the other leg of said carrier and the greater height leg of a carrier is provided with a wing which extends over the upper end of the smaller height leg of an adjacent carrier.

7 Claims, 1 Drawing Sheet

CONVEYOR

BACKGROUND OF THE INVENTION

1. Field of the Invention

The invention relates to a conveyor comprising a frame and an endless drivable conveying element, which is provided with carriers extending transversely to the intended direction of movement of the conveying element during operation, which carriers are coupled to at least one endless flexible coupling member, whilst at least a few carriers support pusher elements, which pusher elements are connected to guide-means, which are capable of co-operation with guide rails supported by the frame, all this in such a manner that a pusher element can be moved in the longitudinal direction of the associated carrier in one or more selected places during operation and whereby, seen in cross-sectional view, a carrier comprises two upwardly extending legs bounding a recess having a U-shaped or V-shaped section and being open at its upper side, which legs are interconnected by a connecting piece forming the bottom of said recess.

DISCUSSION OF THE BACKGROUND

A conveyor of this type is known from French Patent No. 2 592 639. The conveyor referred to is specifically intended and designed for transporting certain tubular products.

SUMMARY OF THE INVENTION

The object of the invention is to provide a more universal conveyor, which is suitable for transporting various smaller and/or lighter objects, non-rigid objects, such as envelopes, irregularly shaped objects and the like, whereby it must be possible for the objects to project above the legs bounding the recess without any risk of objects getting undesirably jammed between the carriers.

According to the invention this objective can be accomplished in that one leg of a carrier extends over a greater height than the other leg of said carrier and in that the greater height leg of a carrier is provided with a wing which extends over the upper end of the smaller height leg of an adjacent carrier.

By using the construction according the the invention the risk of parts of the objects to be transported landing between the closely spaced legs of successive carriers is excluded.

Preferably a part of the pusher element positioned in the recess in a carrier is thereby connected to a guide member positioned under said carrier by means of a middle piece extending between two successive carriers and under the wing connected to one of said carriers, so that objects to be received in the recesses will only come into contact with the part of the pusher element positioned within the recess. Efficiently the section of said part of the pusher element extending into the recess at least substantially corresponds with the section of said recess thereby, so that the risk of parts of the objects to be moved getting jammed between the pusher element and the carrier is excluded.

Efficiently at least the rear leg of a carrier slopes upward in a direction opposed to be intended direction of movement. More or less elongated objects may thereby be placed in a recess in an upright position, for example, whereby objects having a dimension larger than the width of a carrier can be accommodated and transported in close-together relationship in the successive carriers, as a result of which a larger capacity of the device for processing objects can be obtained.

BRIEF DESCRIPTION OF THE DRAWINGS

The invention will be explained in more detail hereafter with reference to an embodiment of the construction according to the invention diagrammatically illustrated in the accompanying Figures.

DISCUSSION OF THE PREFERRED EMBODIMENTS

Figure 1:
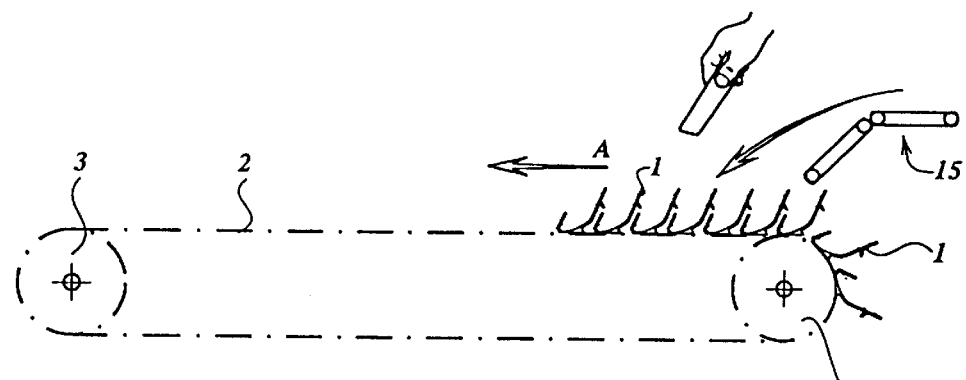
FIG. 1 is a diagrammatic side view of a conveyor according to the invention.
Figure 2:
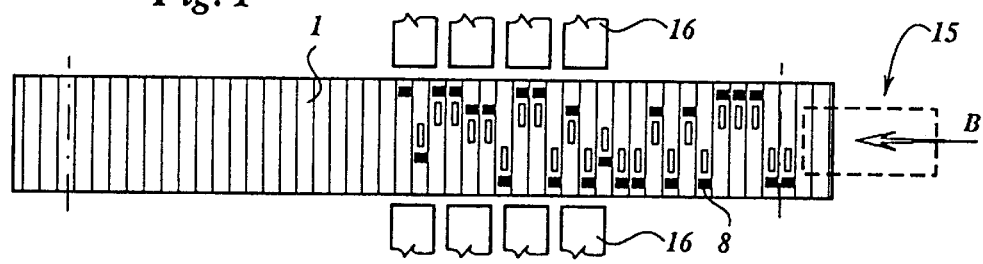
FIG. 2 is a diagrammatic plan view of the conveyor shown in FIG. 1.

FIGS. 1 and 2 diagrammatically show a conveyor comprising a plurality of carriers 1 extending parallel to each other, which carriers are interconnected by one or more flexible coupling members 2, for example chains or the like.

Coupling member(s) 2 is (are) passed over sprocket wheels 3 or the like, which are supported in a frame (not shown), whereby one of said sprocket wheels can be driven in order to move the carriers 1 in the intended direction of movement according to arrow A during operation.

The general construction and operation of a conveyor of this type is generally known, for example from the European Patent No. 0 444 734 and from FR-A-2 388 737, U.S. Pat. No. 4,138,008 and U.S. Pat. No. 3,361,247 being referred to in said European Patent, so that it will not be necessary to enter into a detailed discussion of the construction and operation of such a conveyor herein.

Figure 3:
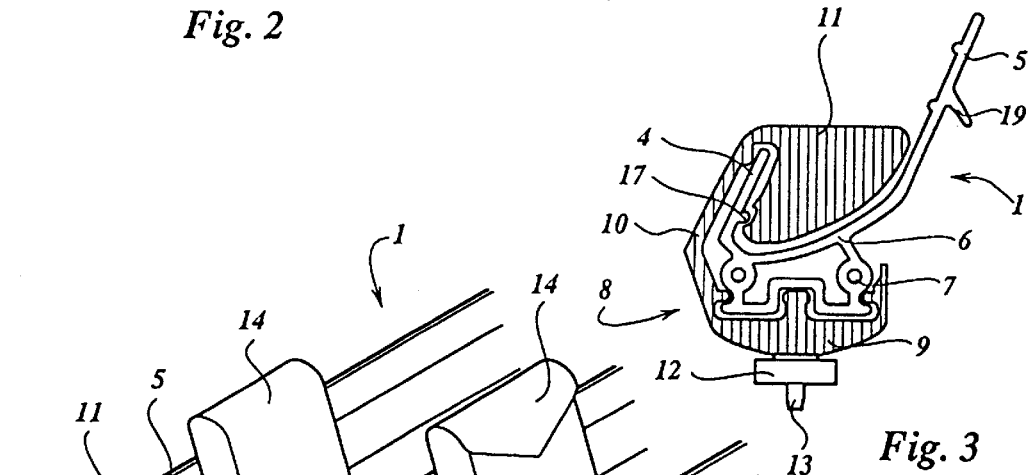
FIG. 3 is a larger-scale sectional view of a carrier a pusher element co-operating with said carrier.
Figure 4:
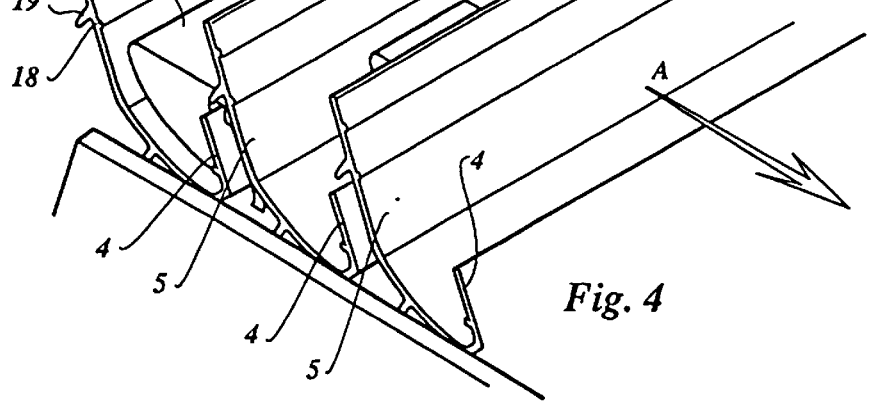
FIG. 4 is a perspective view of a few carriers which are arranged one behind the other.

As is apparent more particularly from FIGS. 3 and 4, a carrier 1 as used in the illustrated embodiment has a more or less trough-shaped section comprised of two legs 4 and 5 extending substantially parallel to each other and being interconnected by a connecting piece 6, which slopes upwards from the bottom end of leg 4 in the direction of the bottom end of leg 5. Leg 4, which is positioned ahead of leg 5 when seen in the intended direction of movement according to arrow A, thereby extends over a smaller height than leg 5. At its bottom side the carrier is provided with a guide member 7 extending throughout the length of said carrier, said guide member being intended for guiding a pusher element 8.

It is noted that for the sake of convenience the construction of a carrier and an associated pusher element as described and claimed is based on the position said parts occupy in the upper part of the conveying element, which position is suitable for accommodating the objects to be transported.

Pusher element 8 comprises a lower part 9 which co-operates with guide member 7, which part is connected, by means of a middle piece 10 extending along leg 4 of carrier 1, to a pusher piece 11 positioned in the recess bounded by legs 4 and 5 of said carrier. Furthermore a guide wheel 12 and a pin 13 extending under said guide wheel 12 are provided on the underside of pusher element 8, which pin is intended for co-operation with guide rails (not shown) supported by the frame of the conveyor, all this in such a manner that pusher element 8 can be selectively moved at selected locations in the longitudinal direction of the respective carrier 1, all this in the manner explained in the aforesaid publications.

As is indicated in FIG. 4 an object 14, for example in the shape of a box, a book or the like, can be placed in the recess bounded by legs 4 and 5 and connecting piece 6 of a carrier 1.

As is diagrammatically indicated in FIG. 1, said placing of the objects in the carriers at a charging station, for example In the direction indicated by arrow B, may take place manually or mechanically, for example by means of a conveyor 15. An object accommodated in a carrier way be discharged in one of a plurality of discharging stations 16 diagrammatically indicated in FIG. 2, by pushing object 14 from the carrier by means of a pusher element 8, which is done by moving said pusher element in the longitudinal direction of the carrier in question.

Because in particular the rear leg 5, seen in the direction of movement according to arrow A, of a carrier slopes slightly upwards in a direction opposed to the direction of movement, a favourable support of the objects can be effected. Other arrangements of the legs are conceivable, of course.

As appears in particular from FIG. 3, leg 4 is provided with a noise 17 extending throughout the length of the leg and projecting towards the opposite leg 5, which nose is inserted in a correspondingly shaped groove or recess in pusher piece 11 present in the trough, whose section is adapted to the section of the recess present between legs 4 and 5.

As is shown in FIG. 4, a similar nose 18 may also be provided a leg 5, whilst another similar nose may be provided on connecting piece 6, if desired, depending on the objects to be transported. By providing such a nose or noses objects are prevented from getting jammed between per pusher piece 11 and legs 4 and 5.

A wing 19 extending the length of leg 5 is furthermore provided on the side of leg 5 facing away from leg 4 of the same carrier, which wing extends over the upper end of leg 4 of an adjacent carrier, as will be apparent from FIG. 4, in order to prevent objects from getting jammed between successive carriers.

Of course additions and/or modifications are conceivable within the spirit and scope of the invention. In the illustrated embodiment, in which discharging stations are provided on either side of the conveyor, the elongated carriers 1 will be open on either side. In those cases where objects are to be discharged on only one side of the conveyor a carrier may be closed at one end.

Furthermore an embodiment will for example be conceivable wherein discharge openings are provided in one or more places in the underside of carrier 1, via which openings objects being transported can be discharged. In that case the recess in the carrier may be closed at one or at both ends of the carrier, if desired.

In the illustrated embodiment pusher piece 11 of the pusher element extends into the recess formed between legs 4 and 5. Depending on the objects to be transported it will also be conceivable, however, for the pusher piece to be positioned above said recess and to engage a part of an object that projects from said recess.

Furthermore the shape of the recess and of the parts bounding the recess may be adapted to the shape of the objects to be transported. Thus it is not necessary for legs 4 and 5 to extend parallel to each other, they may also bound a V-shaped recess or the like, for example.

Furthermore it will for example be conceivable for leading leg 4 to extend over a greater height than leg 5.

I claim:

1. A conveyor comprising a frame and an endless drivable conveying element, which is provided with carriers extending transversely to the intended direction of movement of the conveying element during operation, which carriers are coupled to at least one endless flexible coupling member, while at least a few carriers support pusher elements, which pusher elements are connected to guide-means, which are capable of co-operation with guide rails supported by the frame, all this in such a manner that a pusher element can be moved in the longitudinal direction of the associated carrier in one or more selected places along said intended direction of movement during operation and whereby, seen in cross-sectional view, a carrier comprises two upwardly extending legs bounding a recess having a U-shaped or V-shaped section and being open at its upper side, which legs are interconnected by a connecting piece forming the bottom of said recess, while one leg of a carrier extends over a greater height than the other leg of said carrier and the greater height leg of a carrier is provided with a wing which extends over the upper end of the smaller height leg of an adjacent carrier.

2. A conveyor according to claim 1, wherein a part of the pusher element positioned in the recess in a carrier is connected to guide member positioned under said carrier by means of a middle piece which extends into a space between said carrier and an adjacent carrier and under the wing of the adjacent carrier.

3. A conveyor according to claim 1, wherein the two legs of a carrier extend at least substantially parallel to each other.

4. A conveyor according to claim 1, wherein a rearmost of said two legs, seen in the intended direction of movement of the conveying element, extends over a greater height than the other leg of the carrier.

5. A conveyor according to claim 1, wherein at least a rearmost of said two legs, seen in the intended direction of movement of the conveying element, of the carrier slopes upward in a direction opposed to the intended direction of movement.

6. A conveyor according to claim 1, wherein the section of a part of the pusher element extending into the recess at least substantially corresponds with the section of the recess of the carrier.

7. A conveyor according to claim 6, wherein a nose extending in the longitudinal direction of said carrier is provided on a leg of the carrier bounding said recess, said nose extending in a groove formed in the part of the pusher element extending into said recess.

* * * * *